US006973095B1

(12) United States Patent
Carrel et al.

(10) Patent No.: US 6,973,095 B1
(45) Date of Patent: Dec. 6, 2005

(54) REMOTE CIRCUIT PROVISIONING

(75) Inventors: David Carrel, San Francisco, CA (US);
Che-Lin Ho, Zephyr Cove, NV (US);
Thomas Stoner, Fremont, CA (US)

(73) Assignee: Redback Networks Inc., San Jose, CA (US)

( * ) Notice: Subject to any disclaimer, the term of this patent is extended or adjusted under 35 U.S.C. 154(b) by 928 days.

(21) Appl. No.: 09/698,849

(22) Filed: Oct. 27, 2000

(51) Int. Cl.[7] .............................................. H04L 12/66
(52) U.S. Cl. ...................... 370/463; 370/252; 370/420; 379/201.01; 455/419
(58) Field of Search ................................ 370/242, 248, 370/252, 230.1, 410, 420, 419, 421, 254, 370/468, 463; 379/201.12, 201.01, 207.02, 379/15.03; 455/419

(56) References Cited

U.S. PATENT DOCUMENTS

| | | | | |
|---|---|---|---|---|
| 5,347,566 A | * | 9/1994 | Law et al. ............... | 379/27.08 |
| 5,579,324 A | * | 11/1996 | Buhrgard .................. | 370/508 |
| 5,687,224 A | * | 11/1997 | Alley et al. ............ | 379/201.12 |
| 5,706,288 A | * | 1/1998 | Radhakrishnan et al. ... | 370/418 |
| 5,796,723 A | * | 8/1998 | Bencheck et al. ......... | 370/252 |
| 5,881,131 A | * | 3/1999 | Farris et al. ............ | 379/15.03 |
| 6,049,526 A | * | 4/2000 | Radhakrishnan et al. ... | 370/229 |
| 6,118,782 A | * | 9/2000 | Dixon et al. ................ | 370/389 |
| 6,212,169 B1 | * | 4/2001 | Bawa et al. ................ | 370/252 |
| 6,396,810 B1 | * | 5/2002 | Hebel ......................... | 370/248 |
| 6,466,779 B1 | * | 10/2002 | Moles et al. ................ | 455/410 |
| 6,721,735 B1 | * | 4/2004 | Lee ............................ | 707/5 |
| 6,778,525 B1 | * | 8/2004 | Baum et al. ................ | 370/351 |
| 6,778,531 B1 | * | 8/2004 | Kodialam et al. .......... | 370/390 |
| 6,791,952 B2 | * | 9/2004 | Lin et al. .................... | 370/281 |
| 2003/0162533 A1 | * | 8/2003 | Moles et al. ................ | 455/419 |

OTHER PUBLICATIONS

S. Keshav, An Engineering Approach to Computer Networking ATM Networks, the Internet, and the Telephone Network, Chapter 15: ATM Network Protocols, pp. 523-532, Addison-Wesley Professional Computing Series.
W. Simpson, The Point-to-Point Protocol (PPP), Network Working Group, RFC 1661, Jul. 1994.
"Access Operating System (AOS) Command Reference," Part No. 220-0123-01, Redback Networks (21 pgs).
"Access Operating System (AOS) Configuration Guide," Release 2.3, Part No. 220-0113-01, Redback Networks (7 pgs).
"Access Operating System (AOS) Configuration Guide," Release 3.1, Part No. 220-0122-01, Redback Networks (13 pgs).
"Release Notes for Redback AOS Release 3.1.4," Apr. 2000, Part No. 220-0121-03, Redback Networks (6 pgs).
Redback AOS 2.3 Configuration Guide, Release 2.3, Part No. 220-0113-01, pp. 5-17 through 5-22.

* cited by examiner

Primary Examiner—Ajit Patel
Assistant Examiner—Chirag Shah
(74) Attorney, Agent, or Firm—Blakely, Sokoloff, Taylor & Zafman LLP

(57) ABSTRACT

A machine readable medium for remote circuit provisioning is described. In one embodiment of the invention, a machine readable medium comprises receiving a packet on a circuit and provisioning the circuit in response to receiving the packet, wherein provisioning the circuit comprises retrieving parameters from a database, creating an empty circuit structure, and populating the empty circuit structure with the parameters.

19 Claims, 10 Drawing Sheets

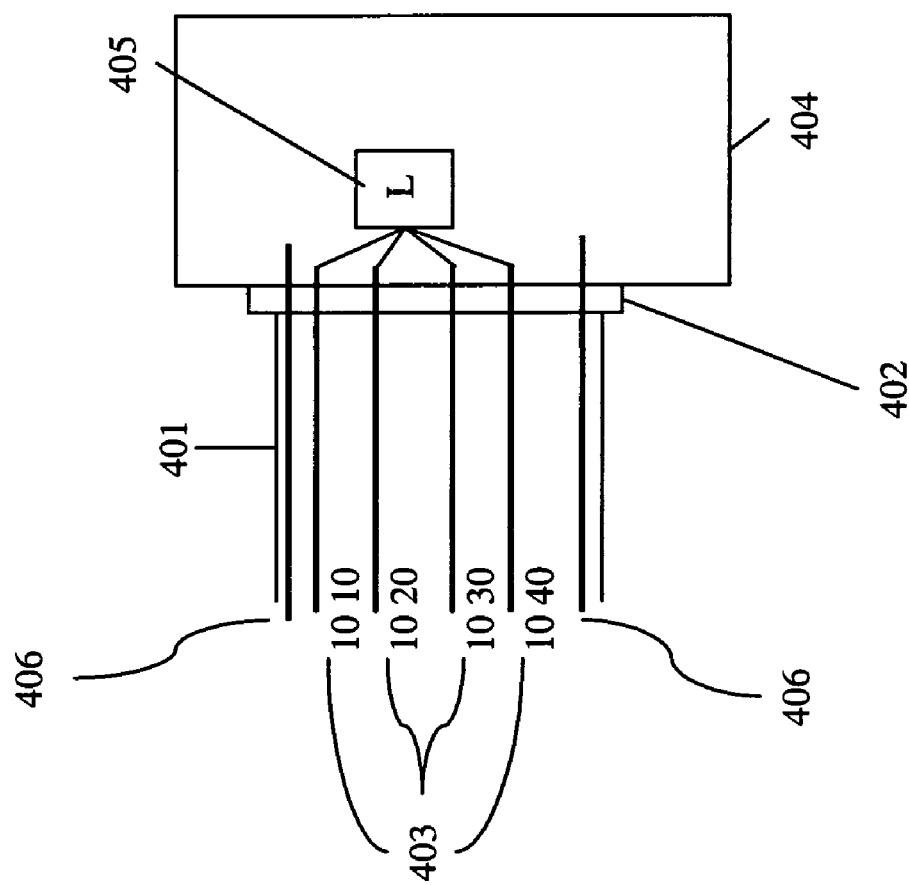

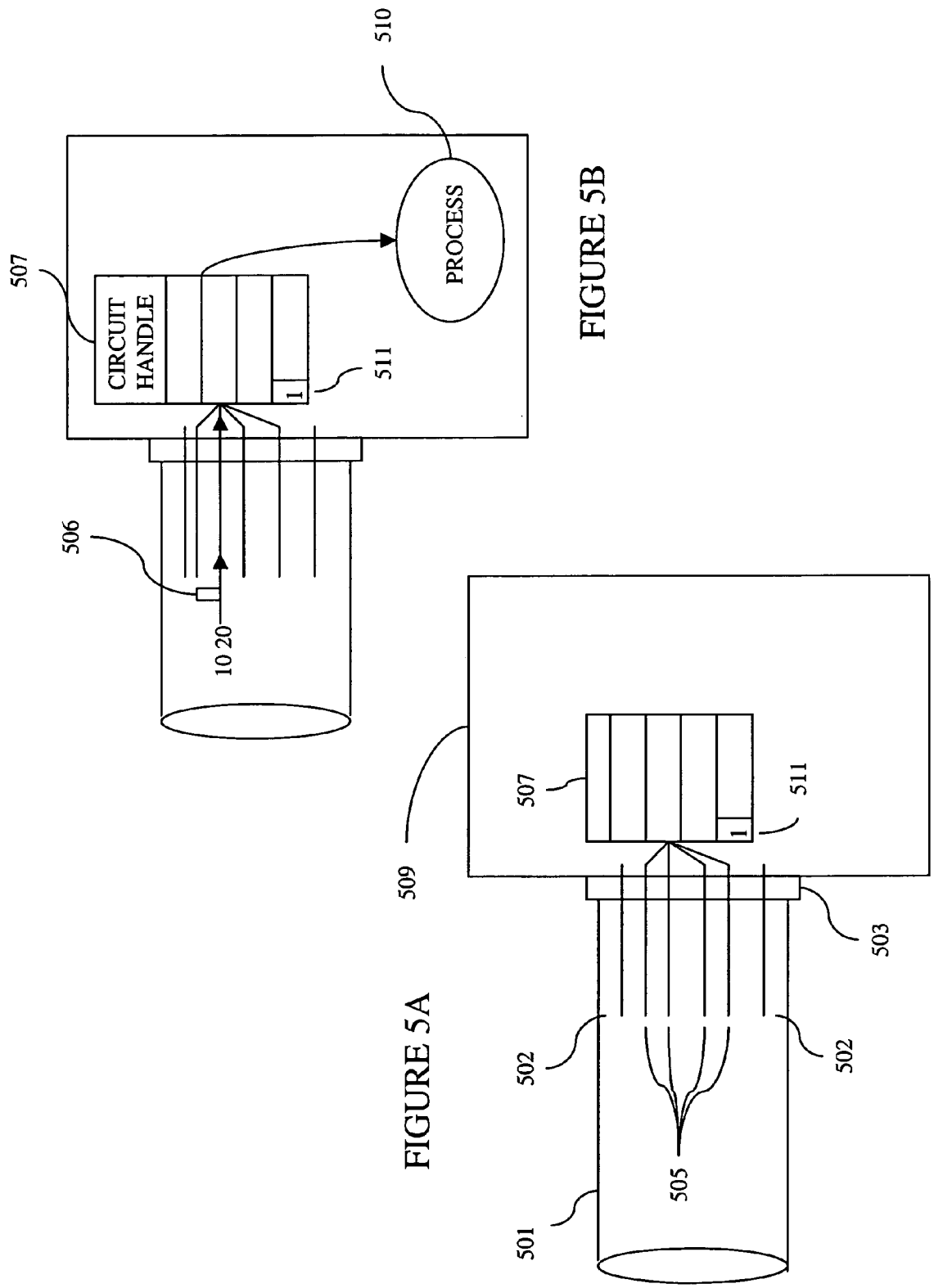

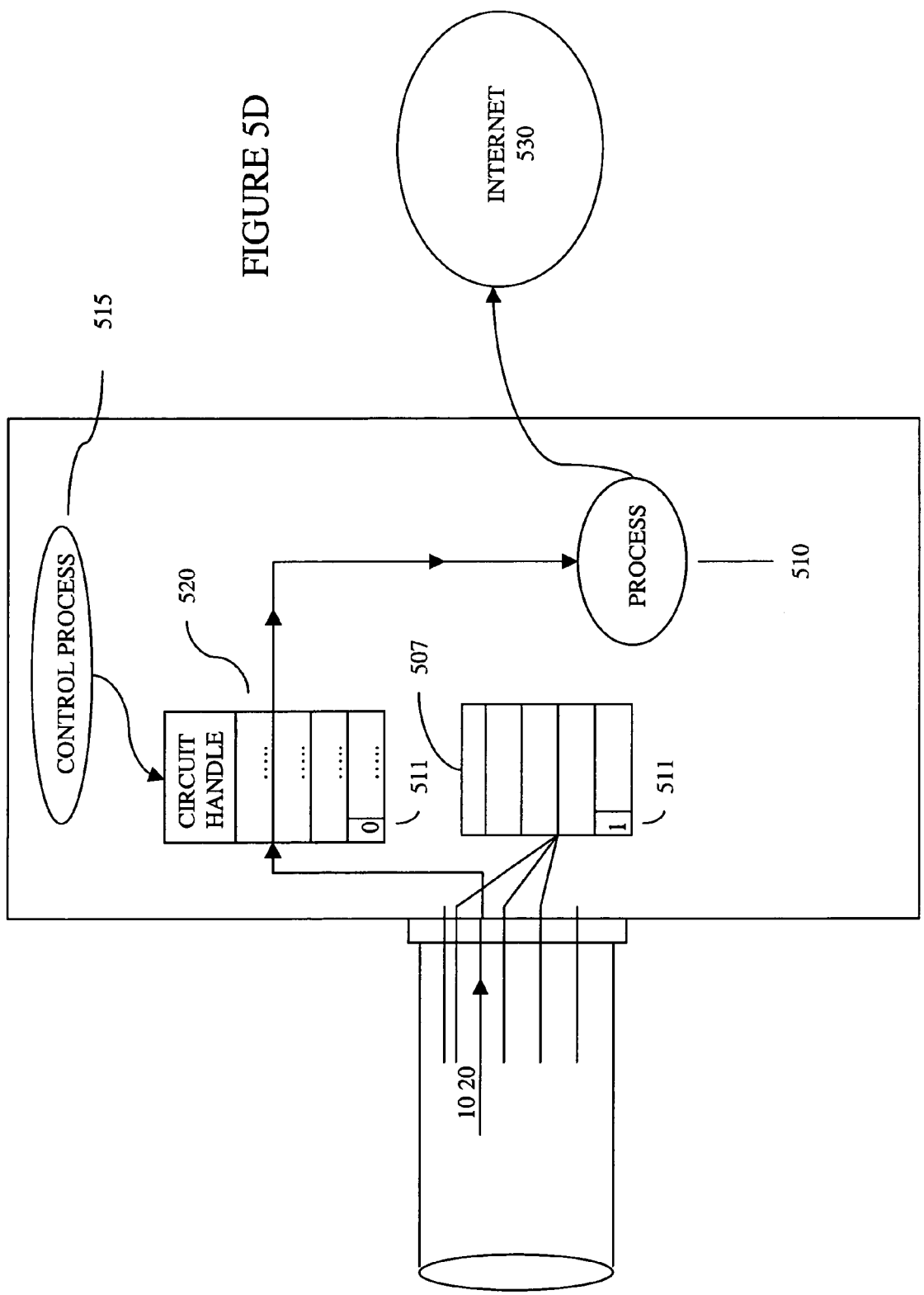

REMOTE CIRCUIT PROVISIONING

BACKGROUND OF THE INVENTION

1. Field of the Invention

This invention relates to the field of networks, particularly to the area of communication networks. More specifically, the present invention relates to remotely provisioning resources.

2. Description of the Related Art

The number of people and corporations connecting to the Internet has continually grown since the inception of the Internet. As of late 1999, the leading Internet Service Providers in the United States served a total of 35 million subscribers ("Major Trends Affecting the Telecommunications Industry", Plunkett's Telecommunications Industry Almanac). Between 1998 and 1999, the number of connections to the Internet across the globe has grown from 56.5 million to 73.7 million ("Ovum Report: Internet Market Forecasts: Global Internet Growth 1998–2005", GSM Data Knowledge Site).

This vast amount of growing Internet activity relies on numerous network elements. These network elements include routers, cables, hubs, relays, switches, etc. to carry communications between and among networks. An increasing number of network elements have been deployed to support increasing Internet traffic, but advancements in network technology have also been necessary to support the explosion in network traffic.

Current network elements assume multiple tasks such as terminating network connections, switching, routing, and access functions. These current network elements have been developed to support the vast and growing number of subscribers communicating across networks and across the Internet. Network elements have advanced from serving hundreds to serving thousands of subscribers, and now to hundreds of thousands of subscribers. These network elements are configured to support a variety of communication protocols used by the multitude of subscribers. These supported communication protocols may include Asynchronous Transfer Mode (ATM), Frame Relay, and various tunneling protocols. In addition, data is transmitted in stacks of protocols. For example, a subscriber may send data which is Point to Point Protocol (PPP) over 1483 bridged circuit over ATM to a network element. Each circuit connecting to a network element must be configured for the type of traffic carried over the circuit.

FIG. 1 (Prior Art) is a diagram of a network element terminating circuits of a network medium. Although only 4 physical circuits 105 are illustrated, a network medium 101 (such as copper wire, coaxial cable, fiber, etc) can be comprised of thousands of physical circuits. The ATM protocol channelizes a network medium so that each of the physical circuits 105 can carry a separate subscriber session. The ATM medium 101 connects to a port 103 on the network element 110. The network administrator configures each circuit to be a locally provisioned circuit. The network administrator must enter parameters for each physical circuit 105 at a terminal connected to the network element 110. The parameters can include traffic shaping, Access Control List (ACL) selection, the encapsulation for the circuit, etc. The parameters are stored on the network element 110 in a number of provisioned circuit structures 108. When the network administrator configures a circuit to be a provisioned circuit, a provisioned circuit structure is created. The provisioned circuit structure is populated with the parameters entered by the network administrator and associated with the circuit identified by the network administrator during configuration. The network element processes traffic received on the provisioned circuit as indicated by the parameters populating the provisioned circuit structure. For ATM, the network manager would identify the slot, port, virtual path identifier (VPI) and virtual channel identifier (VCI) of the physical circuit being configured. When data is received on the physical circuit with a VPI-VCI 10-40 on port 3 of slot 2, the network element looks for the provisioned circuit structure for the 10-40 circuit on port 3 at slot 2. The provisioned circuit structure contains the parameters for the network element to correctly process the data received. Data received on one of the physical circuits 105 not configured by the network administrator would not be processed by the network element 110 and would be discarded. Since the number and location of terminals connected to the network element is limited, this method of provisioning circuits becomes less manageable as the number of subscribers of a network element increases. In addition, a vast number (possibly ranging from hundreds of thousands and beyond) of provisioned circuit structures would consume large quantities of valuable memory in the network element.

FIG. 2 (Prior Art) is a diagram of dynamic tunnel provisioning between network elements with a remote database. A packet is sent over a physical circuit 201 to a network element 217. As in FIG. 1, the packet received on the physical circuit 201 is associated to a provisioned circuit structure 203 corresponding to the physical circuit 201 containing parameters entered by the network administrator using a terminal connected to the network element 217. The received data packet is decapsulated by a layer 1 decapsulation routine 204 (e.g. ATM) as determined by the entered parameters. The decapsulated packet is then decapsulated by a layer 2/3 decapsulation routine 207, such as a PPP decapsulation routine. The layer 2/3 routine 207 passes a subscriber identifier (e.g. user1@domain.com) identified in the data packet to the Authorization, Authentication, and Accounting (AAA) process 205. AAA 205 requests information from a remote database 209 for the identified subscriber. The remote database 209 returns information indicating the subscriber is to be tunneled through a tunnel designated tunnelname. AAA searches for tunnelname in a list of active tunnels. If the tunnel is active, then the physical circuit 201 is bound to the active tunnel. If the tunnel is not active, AAA 205 sends another request to the remote database 209 for information corresponding to the tunnel tunnelname. The remote database 209 returns tunnel configuration information to AAA 205. AAA 205 passes this information to a tunnel routine which establishes a tunnel 211 and a session 215 for the subscriber with a peer network element 219. Dynamic tunnel provisioning allows a network manager to enter tunnel configurations as needed in the remote database instead of at a local terminal.

Dynamic tunnel provisioning is triggered by a subscriber identifier stored within a layer 2/3 encapsulation. Dynamic tunnel provisioning does not relieve the task of configuring each circuit on the network element nor resolve the issue of memory consumption to support a circuit structure for each provisioned circuit.

SUMMARY OF THE INVENTION

The invention provides a method and apparatus for remotely provisioning circuits. According to one aspect of the invention, a method is provided which provisions circuits with parameters from a remote database.

According to one embodiment of the invention, a circuit receives a packet and the circuit is provisioned in response to the packet received. In one embodiment provisioning comprises receiving parameters from a remote database, creating an empty circuit structure, populating the circuit structure with the parameters, and associating the circuit to the provisioned circuit structure.

In an alternative embodiment of the invention, a set of circuits are configured as listening circuits. When one of the set of listening circuits receives a packet, the listening circuit is provisioned, and subsequent packets received on the provisioned circuit are processed according to parameters corresponding to the provisioned circuit. A packet received on an unconfigured circuit is discarded.

According to another embodiment of the invention, as set of circuits are associated to a listening circuit structure. When one of the set of circuits receives a packet, the one is identified and a set of parameters are retrieved for the identified circuit. An empty circuit structure is created and populated with the set of parameters to become a provisioned circuit structure. The identified circuit is disassociated from the listening circuit structure and associated to the provisioned circuit structure. Upon a subscriber ending event, a clean-up agent removes the provisioned circuit structure and reassociates the identified circuit with the listening circuit structure.

These and other aspects of the present invention will be better described with reference to the Detailed Description of the Preferred Embodiment and the accompanying Figures.

BRIEF DESCRIPTION OF THE DRAWINGS

The invention may best be understood by referring to the following description and accompanying drawings that are used to illustrate embodiments of the invention. In the drawings:

FIG. 4A is a diagram of a network element with a set of circuits configured as listening according to one embodiment of the invention.

FIG. 5A is a diagram of a network element with circuits configured as listening circuits according to one embodiment of the invention.

FIG. 5B is a diagram of a network element responding to network traffic according to one embodiment of the invention.

FIG. 5D is a diagram of a network element provisioning a circuit in response to network traffic according to one embodiment of the invention.

DETAILED DESCRIPTION OF THE DRAWINGS

In the following description, numerous specific details are set forth to provide a thorough understanding of the invention. However, it is understood that the invention may be practiced without these specific details. In other instances, well-known protocols, structures and techniques have not been shown in detail in order not to obscure the invention. For example, the term routine is used throughout the application. The term routine can mean an individual process, a thread of a process, a routine of a process or program, etc.

The invention provides for a method and apparatus for remotely provisioning circuits on a network element. According to one embodiment of the invention, a circuit of a network element may be configured by an network administer at a terminal connected to that network element to be a listening circuit. In addition, the same or a different network administrator may enter parameters for that circuit into a remote database connected to the network element. Upon the occurrence of an event (e.g., the receipt of traffic on the circuit), the network element will access the parameters from the remote database and provision the circuit.

Figure 2:
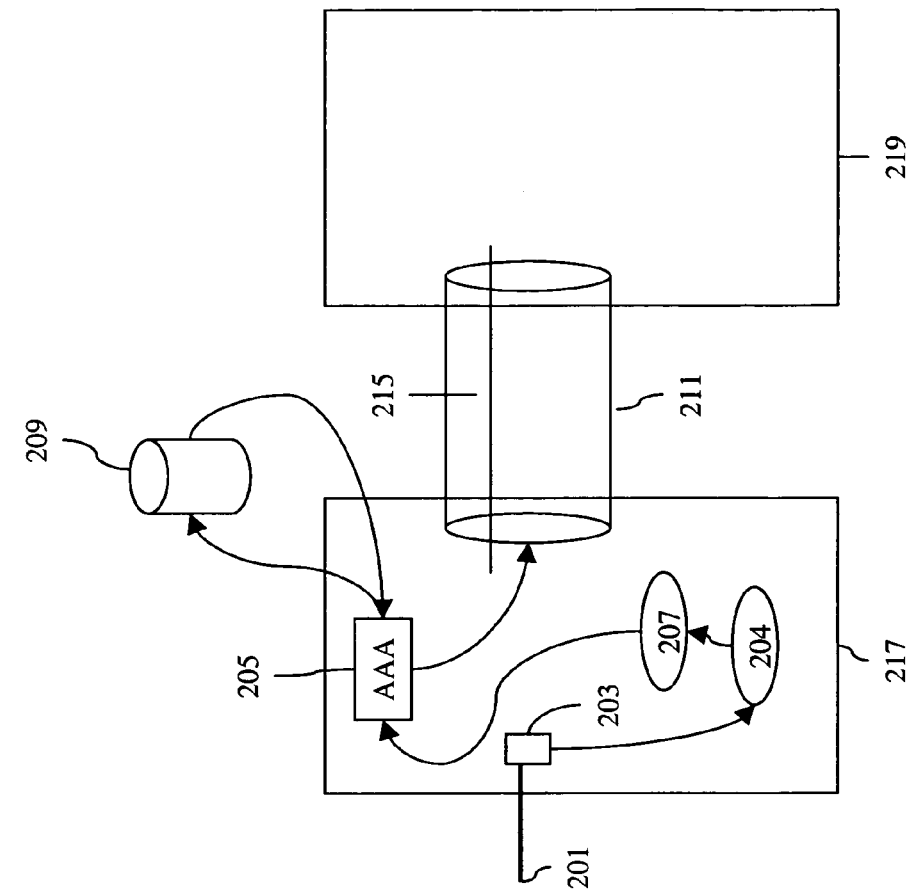
FIG. 2 (Prior Art) is a diagram of dynamic tunnel provisioning between network elements with a network medium.
Figure 1:
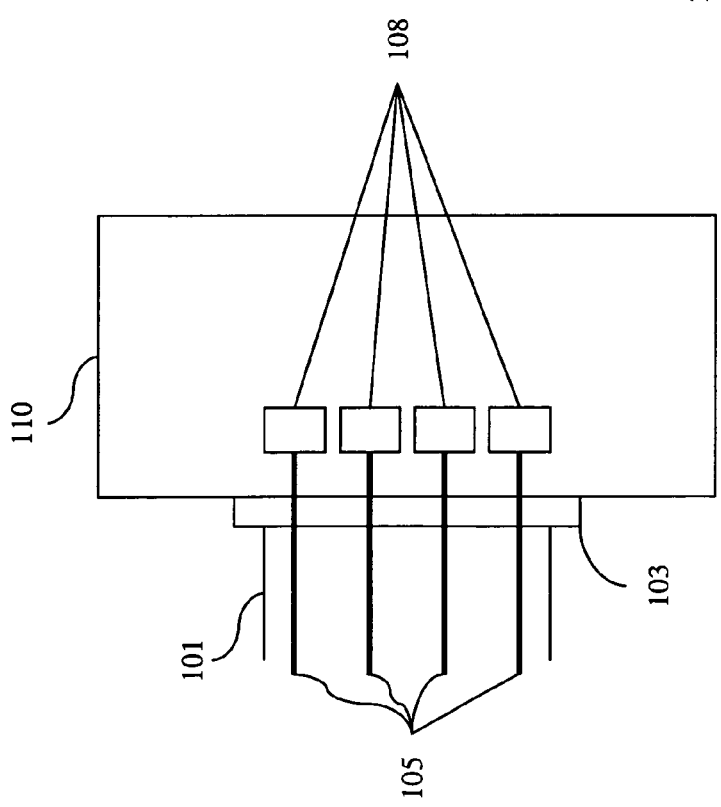
FIG. 1 (Prior Art) is a diagram of a network element terminating circuits of a network medium.
Figure 3:
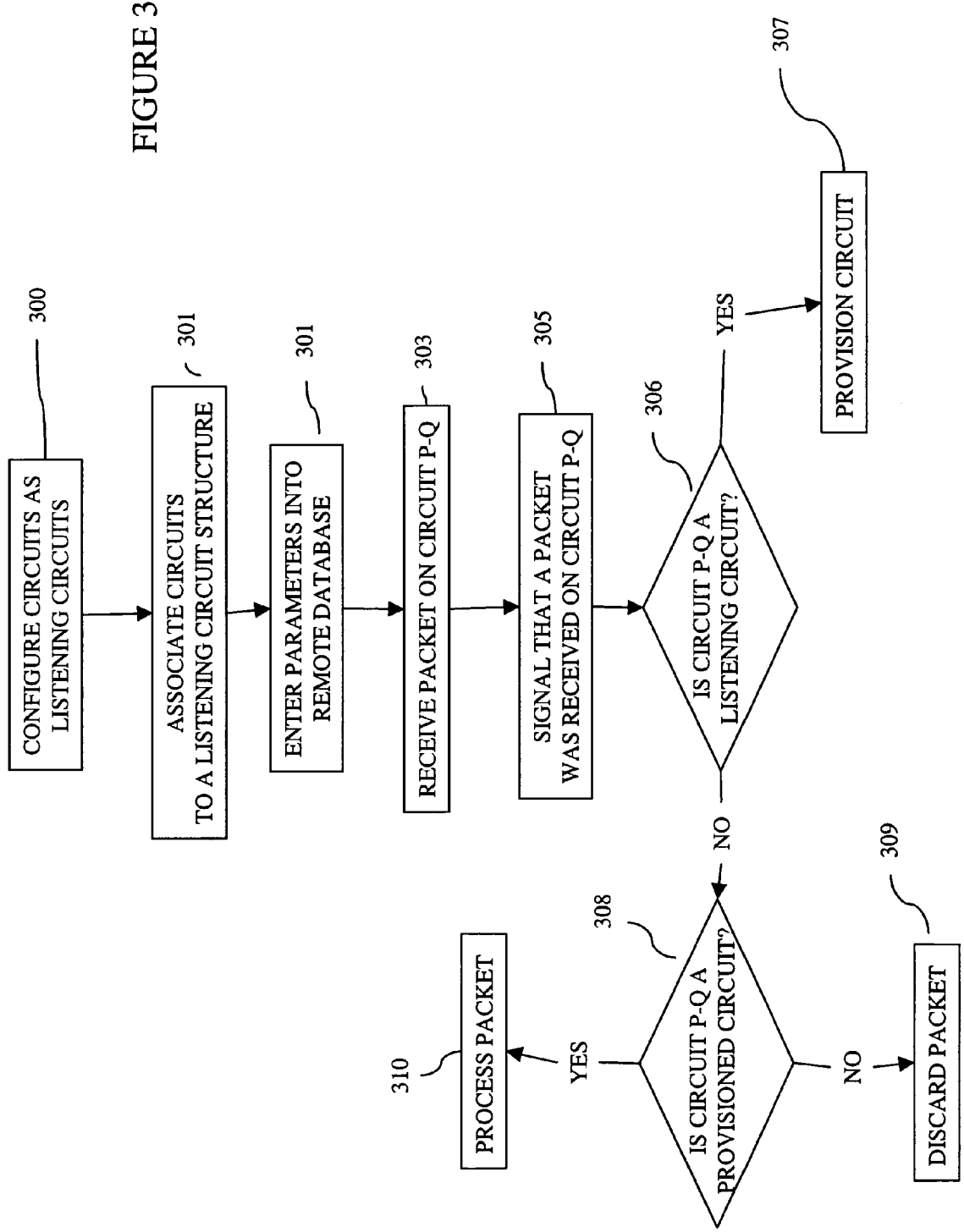
FIG. 3 is a flowchart for provisioning a circuit in response to activity on the circuit according to one embodiment of the invention.
Figure 4C:
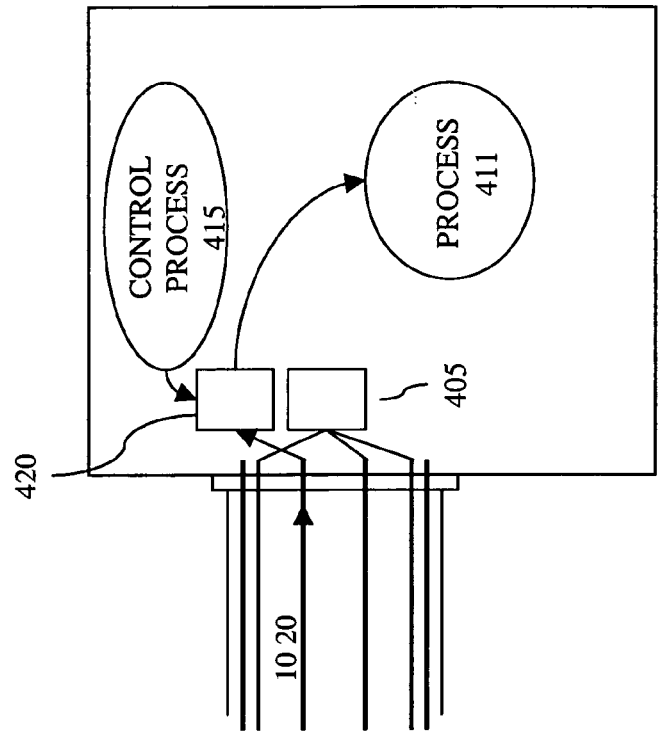
FIG. 4C is a diagram of a network element processing the listening circuit structure according to one embodiment of the invention.
Figure 4B:
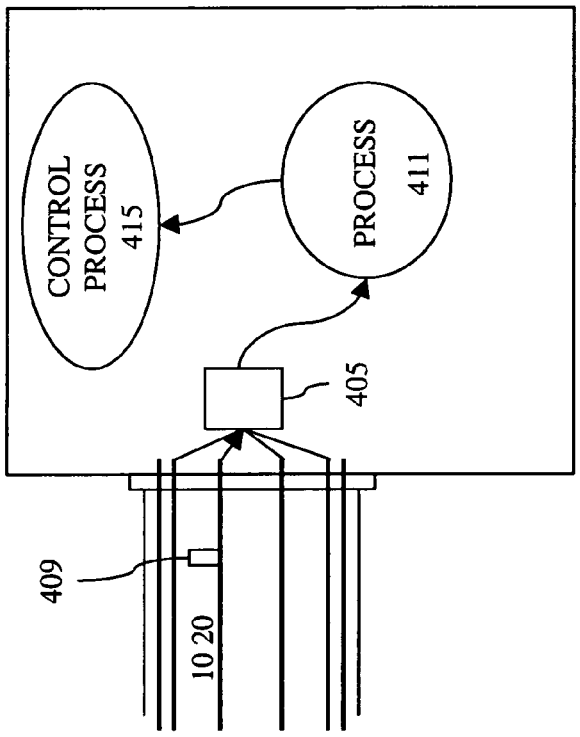
FIG. 4B is a diagram of the network element receiving a packet over a circuit according to one embodiment of the invention.

FIG. 3 is a flowchart for provisioning a circuit in response to activity on the circuit according to one embodiment of the invention, while FIGS. 4A–4C illustrate provisioning a circuit in response to a data packet being received according to one embodiment of the invention. FIG. 3 is described with reference to FIGS. 4A–4C to aid in the understanding of the invention. Initially, a network administrator selects a set of circuits to be configured (in certain embodiments, circuits may optionally still be provisioned as described in the background section). The network administrator then configures these circuits at a terminal connected to the network element as listening circuits at block 300. As a result of the network administrator configuring circuits as listening circuits (also know as on-demand circuits), the network element creates a single listening circuit structure and associates the multiple listening circuits to the listening circuit structure at block 301. To illustrate, we turn to FIG. 4A.

FIG. 4A is a diagram of a network element with a set of circuits configured as listening according to one embodiment of the invention. In FIG. 4A, a network medium 401 (e.g. fiber optic cable, coaxial cable, copper wire, etc) is coupled to a port 402 on the network element 404. Although only 4 listening circuits 403 and 2 unconfigured circuits 406 are illustrated, the network medium 401 can be composed of thousands of circuits or channels. With reference to FIG. 4A, the network element creates the listening circuit structure 405. The network element associates the listening circuits 403 to the listening circuit structure 405 as described later herein. The unconfigured circuits 406 are not associated to any circuit structure and cannot accept traffic.

Returning to FIG. 3 at block 302, the network administrator enters parameters for the listening circuits in a remote database. In some instances, the network administrator may enter the parameters into the remote database before configuring circuits as listening circuits at the network element. Such a procedure may be followed to insure a listening circuit will have parameters entered in the remote database. The responsibility for entering the parameters and configuring the circuits may be performed by different people at different times. A network provider may configure circuits as listening for its ISP customers, but the ISP may control the parameters for the circuits purchased from the network provider. Thus, it should be understood that although a number of circuits have been configured as listening, the parameters for those circuits might be entered individually over time. If a listening circuit does not have parameters entered into the remote database, then the traffic received on the listening circuit will be discarded until parameters are entered in the remote database. At block 303, the network element receives a data packet on a circuit P-Q (where P is the VPI and Q is the VPN). The control process of the network element is signaled at block 305 that a packet was received on the physical circuit P-Q. At block 306, the network element determines if the circuit P-Q is a listening circuit. If the circuit P-Q is not a listening circuit, network element determines if the circuit is already provisioned at block 308. The circuit receiving the packet may have already been provisioned. In one embodiment of the invention, some circuits on a network element can be remotely provisioned while other circuits are locally provisioned. One example of an embodiment with both types of provisioning could be a network provider servicing different customer types. One type of customer prefers to manage the parameters for the large number of circuits they purchase from the network provider. The circuits purchased by this type of customer would be configured locally as listening circuits and the parameters entered in a remote database by the customer. The other type of customer prefers the network provider to provision the smaller number of circuits purchased by the customer. Since the circuits are fewer and the network provider does not anticipate changing the parameters, the network provider would provision the smaller number of circuits locally. If the circuit is provisioned, then the packet is processed accordingly at block 310. If the circuit receiving the packet is not a provisioned circuit, then the circuit is unconfigured and the packet is discarded at block 309. If circuit P-Q is a listening circuit, then, the physical circuit is provisioned at block 307. To illustrate, we turn to FIGS. 4B and 4C.

FIG. 4B is a diagram of the network element receiving a packet over a circuit according to one embodiment of the invention. FIG. 4B illustrates a data packet 409 being received on the one of the physical circuits 403 with VPI 10 and VCI 20 as described in block 303. A routine 411 detects the packet 409 at circuit 10-20 and signals the control process 415 that a data packet 409 has been received at circuit 10-20.

FIG. 4C is a diagram of a network element processing the listening circuit structure according to one embodiment of the invention. As described in block 307 of FIG. 3, the network element provisions the circuit receiving the data packet. The network element 404 creates an empty circuit structure 420 for the physical circuit 10-20. The empty circuit structure 420 is populated with parameters corresponding to physical circuit 10-20 and becomes a provisioned circuit structure 420. The parameters can be retrieved from a remote database such as RADIUS where a network administrator entered the parameters at some earlier moment in time. The physical circuit 10-20 is disassociated from the listening circuit structure 405 and associated with the provisioned circuit structure 420. Processing of the packets from physical circuit 10-20 is now performed with reference to the parameters stored in the provisioned circuit structure 420 before being sent to the Internet 430 or another network element.

In an alternative embodiment, each circuit configured as a listening circuit could be associated with an individual listening circuit structure instead of a single listening circuit structure for a group of listening circuits. Thus, the control process would not create an empty provisioned circuit structure for each circuit which receives a data packet. The control process would populate the individual listening circuit structures with parameters retrieved from the remote database. Such an embodiment would simplify the functions of the control process but reduce the memory savings of having a single listening circuit structure for a group of listening circuits.

Association of a circuit to a provisioned circuit structure can be implemented in a variety of ways. While the implementation of this aspect of the invention is not limited, a number of examples are presented to aid in understanding the invention. For example, one embodiment could maintain a state structure indicating the state of a circuit: listening, provisioned and unconfigured. The state structure would contain a reference field corresponding to the state. All configured circuits having a listening state refer to the listening circuit structure. All unconfigured circuits in an unconfigured state refer to a null address. The provisioned circuits refer to the address of a provisioned circuit structure. When a listening circuit is provisioned, its state structure is modified to refer to the remotely provisioned circuit structure.

In another embodiment, a linking structure may link a circuit to the appropriate structure. The link structure could index an address with a circuit handle. When a packet arrives, a circuit handle could be created from the slot, port, and VPI-VCI pair. The network element could then search the link structure for the circuit handle and use the parameters stored at the indicated address. The addresses in the link structure would be initialized to a null value. Once a circuit is configured as listening, then the link structure is updated to reflect the address of a listening circuit structure. Once the circuit is provisioned, the data structure is updated to reflect the address of the corresponding provisioned circuit structure.

In one embodiment of the invention, once a listening circuit is provisioned, it remains a provisioned circuit. In alternative embodiments of the invention, after a listening circuit is provisioned, a subscriber ending event will result in the circuit being unprovisioned or reassociated to the listening circuit structure. A clean-up routine or process can be implemented in numerous ways in response to numerous events. A subscriber ending event can include any event wherein the circuit would no longer transmit the subscriber session (e.g., the ISP suspends the customer, port of the circuit fails, servicing of the network element, a subscriber switches from DSL to cable etc.). A timeout routine could determine when a subscriber ending event has occurred. Once the network element determines a subscriber ending event has occurred for a circuit, a clean up routine can operate such that the provisioned circuit structure for that circuit is released from memory, and the circuit is reassociated to the listening circuit structure. Another routine could detect mechanical failure of a port on the network element and reassociate any provisioned circuits of that port to the listening circuit structure. Another embodiment of the invention provides for an ISP customer to send a signal to the network element. Upon receiving the signal the network element reassociates a circuit indicated by the signal to the listening circuit structure. The provisioned circuit structure is then released from memory. Although a number of implementations for this aspect of the invention have been described, they are only described to illustrate examples and not meant to be limiting on the invention.

In an alternative embodiment of the invention, the clean-up routine differentiates between circuits on the same network element which are provisioned remotely and locally. Provisioned circuit structures would be distinguished for locally provisioned and remotely provisioned circuits. For listening circuits, a flag is sent to the control process indicating the circuit is listening. The control process would assign the flag value to an element of the provisioned circuit structure. Upon a subscriber ending event, the clean-up agent will only associate the provisioned circuit to the listening circuit structure if the flag value is detected. If the flag value is not detected, then the clean-up agent can either release the provisioned circuit structure making the provisioned circuit an unconfigured circuit, or the clean-up agent can do nothing. If traffic is not to be processed on the circuit and the clean-up agent does not act on locally provisioned circuits, then a network administrator must release the provisioned circuit.

A MORE DETAILED EXEMPLARY IMPLEMENTATION

Figure 5C:
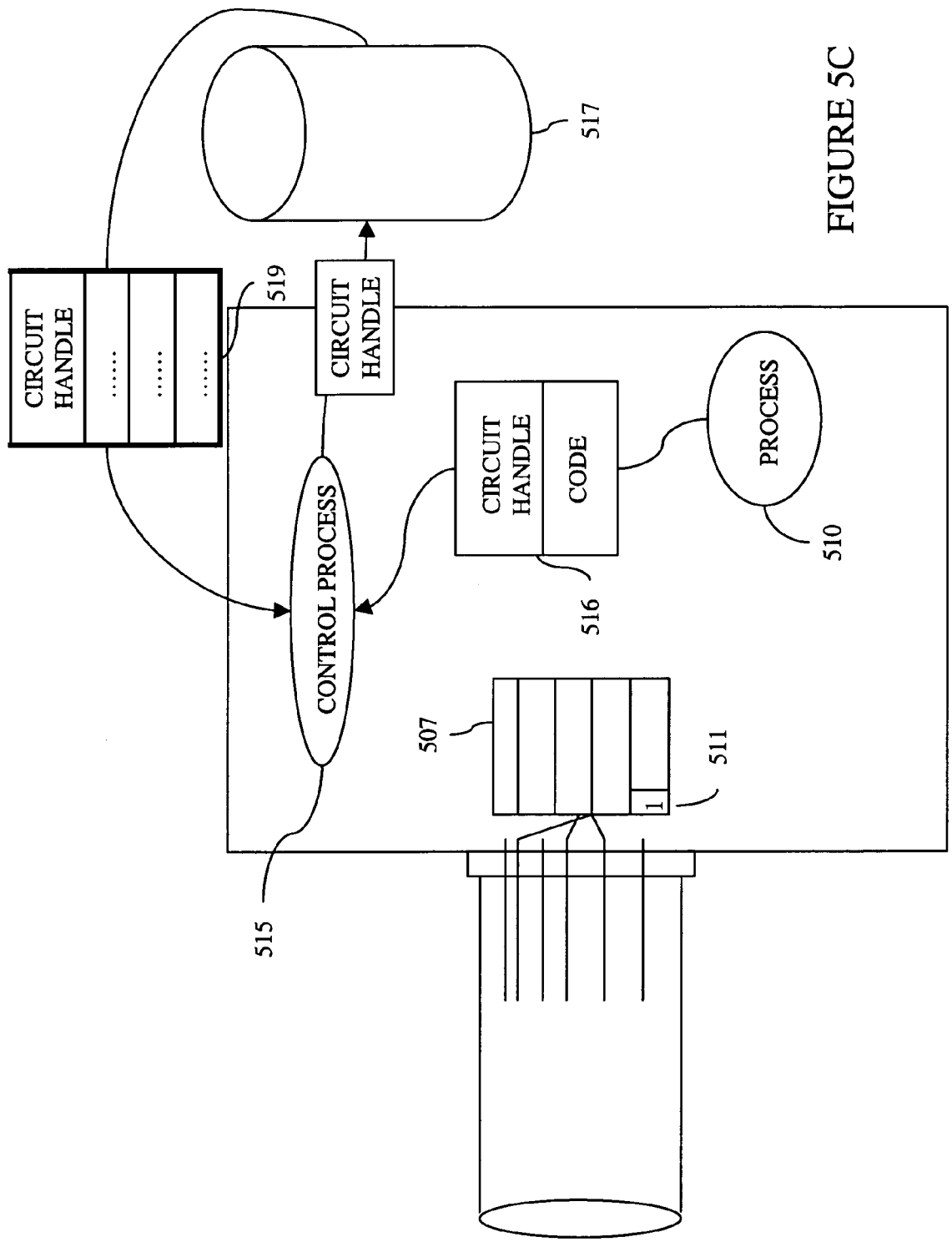
FIG. 5C is a diagram of a network element signaling the control process in response to network traffic according to one embodiment of the invention.

FIGS. 5A–5D are exemplary diagrams of the provisioning of a circuit in response to network traffic according to one embodiment of the invention. FIG. 5A is a diagram of a network element with circuits configured as listening circuits according to one embodiment of the invention. A network medium 501 connects to a port 503 on a network element 509. The network medium 501 can be composed of thousands of physical circuits, but only six physical circuits are illustrated: 4 circuits configured as listening circuits 505 and 2 unconfigured circuits 502. The circuits are configured as listening circuits 505 as described by FIG. 4A and FIG. 3. A listening circuit structure can be distinguished from a provisioned circuit structure in a variety of ways. For example, the listening circuit structure and the provisioned circuit structure could be defined as the same data structure type with a bit flag identifier. If the bit flag is set to 1, then a routine processing the circuit structure will recognize the circuit structure as a listening circuit structure. Otherwise, the routine processes the circuit structure as a provisioned circuit structure. In another implementation of the invention, the provisioned circuit structure and the listening circuit structure could be objects of different classes. The listening circuit structure could be an object of a class inheriting from the class of the provisioned circuit structure. In an alternative embodiment, the listening circuit structure and the provisioned circuit structure could be defined as different data structure types. In the exemplary embodiment illustrated by FIG. 5A, the listening circuit structure 507 includes a bit flag 511 set to 1 identifying the circuit structure as a listening circuit structure.

Figure 6:
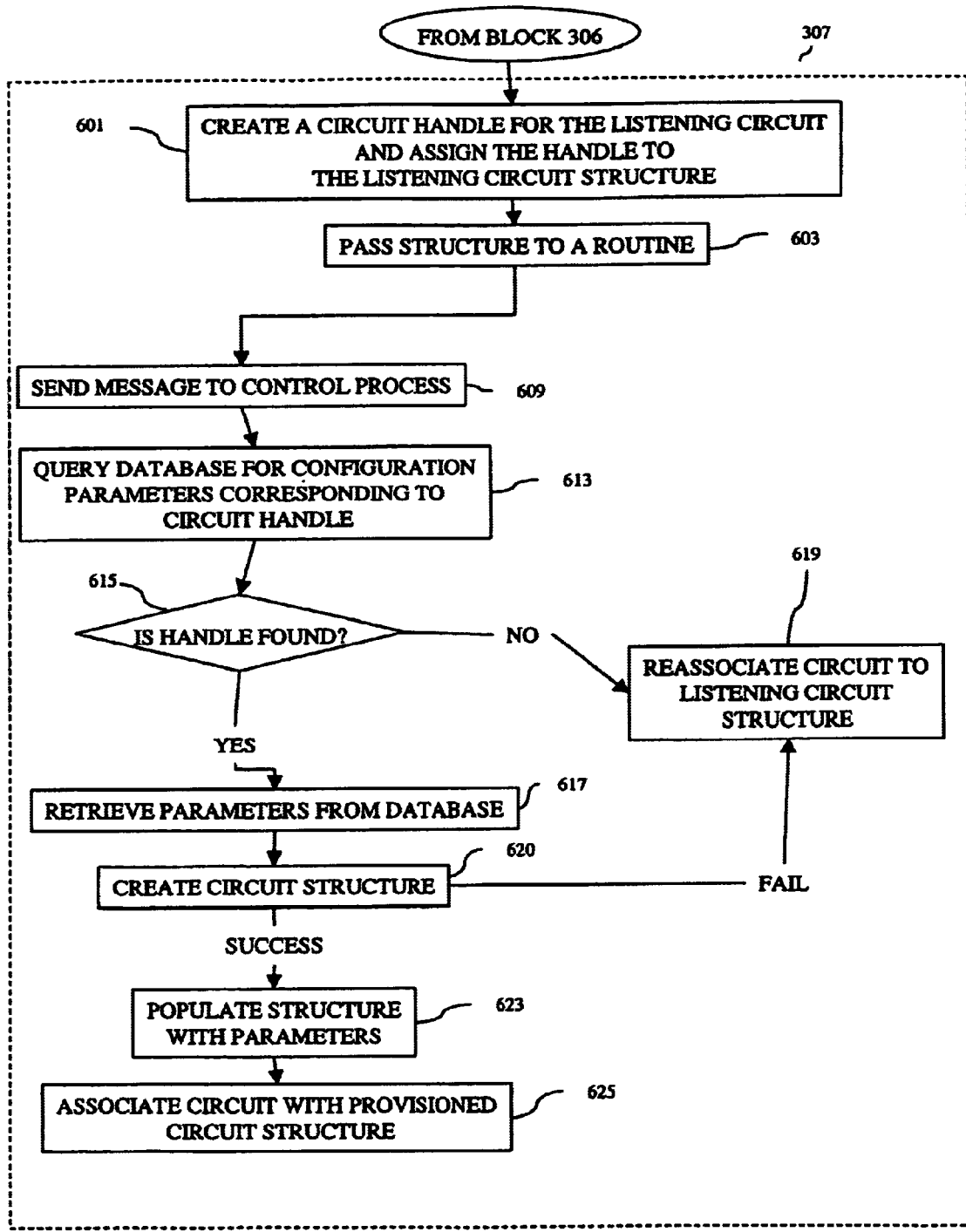
FIG. 6 is a flowchart of an exemplary technique for performing block 307 of FIG. 3 according to one embodiment of the invention.

FIG. 6 is a flowchart of an exemplary technique for performing block 307 of FIG. 3 according to one embodiment of the invention, while FIG. 5B is a diagram of a network element responding to network traffic according to one embodiment of the invention. FIG. 6 will be described with reference to FIGS. 5B–5D to aid in the understanding of the exemplary embodiment of the invention. Once the network element is signaled that a packet has been received on one of the listening circuits (e.g., a circuit with VPI-VCI 10-20) at block 305 of FIG. 3, the network element creates a circuit handle identifying the listening circuit and assigns the handle to an element of the listening circuit structure at block 601. The listening circuit structure identifying the listening circuit 10-20 is passed by value to a routine at block 603 of FIG. 6. We now turn to FIG. 5B.

FIG. 5B is a diagram of a network element responding to network traffic according to one embodiment of the invention. FIG. 5B illustrates the packet 506 being received on the listening circuit 10-20. FIG. 5B also illustrates one of the elements of the listening circuit structure 507 having the circuit handle value assigned and the listening circuit structure 507 being passed to a routine 510. In one embodiment, the circuit handle can be a 32 bit value created from the VCI-VPI pair, the slot on the network element 509, and the port 503 of the network element 509. According to one embodiment of the invention, the listening circuit structure 507 is passed by value because the element of the listening circuit structure may be assigned a different circuit handle if another listening circuit receives a packet. Once the routine receives the listening circuit structure (by value or pointer), it sends a message to the control process at block 609. We now turn to FIG. 5C.

FIG. 5C is a diagram of a network element signaling the control process in response to network traffic according to one embodiment of the invention. FIG. 5C illustrates an exemplary embodiment of the invention wherein the message 516, referred to in block 609 of FIG. 6, includes the circuit handle and a code. The code is an identifier indicating to the control process 515 to "create a circuit." At block 610, the control process disassociates the listening circuit identified by the circuit handle from the listening circuit structure. At block 613, a database is queried with the for parameters for the listening circuit which received a data packet. FIG. 5C illustrates an exemplary embodiment wherein the control process 515 queries a remote database 517 with the circuit handle. The remote database 517 returns the parameters 519 corresponding to the specified circuit handle. At block 615, the control process determines if the circuit handle is found in the database. If the circuit handle is not found, then the control process reassociates the circuit to the listening circuit structure at block 619. If the circuit handle is found in the database, then the parameters are returned to the control process at block 617.

Once the configuration parameters are received, then the control process creates an empty circuit structure in accordance with the "create circuit" code at block 620. If an empty circuit structure cannot be created (e.g. low memory, routine failure, etc.) then control flows to block 619. If the circuit structure is created successfully, then at block 623 the empty circuit structure is populated with the parameters to become a provisioned circuit structure. At block 625, the circuit is associated with the provisioned circuit structure. To illustrate, we turn to FIG. 5D.

FIG. 5D is a diagram of a network element provisioning a circuit in response to network traffic according to one embodiment of the invention. The control process 515 creates an empty circuit structure 520 with the identifier bit 511 indicating the circuit structure is not a listening circuit structure 507. The control process 515 then populates the empty circuit structure 520 with the parameters 519 of FIG. 5C received from the database 517 of FIG. 5C. Afterwards, the control process 515 associates circuit 10-20 with the provisioned circuit structure 520. The network element now uses the parameters stored in the provisioned circuit structure 520 to process the data packets received over circuit 10-20.

The capability to remotely provision circuits is advantageous for a network element servicing relatively large numbers (e.g., hundreds of thousands) of subscribers. Such a network element includes numerous ports coupled to a network medium possibly comprised of thousands of circuits. The variety of communication protocols carried over these ports and circuits require memory for the numerous decapsulation routines. Furthermore, the relatively large number of subscribers serviced by the network element requires memory for routing tables and forwarding tables. In such a network element, memory becomes a premium. Provisioning circuits on demand with a single listening circuit structure conserves this premium resource.

Figure 7:
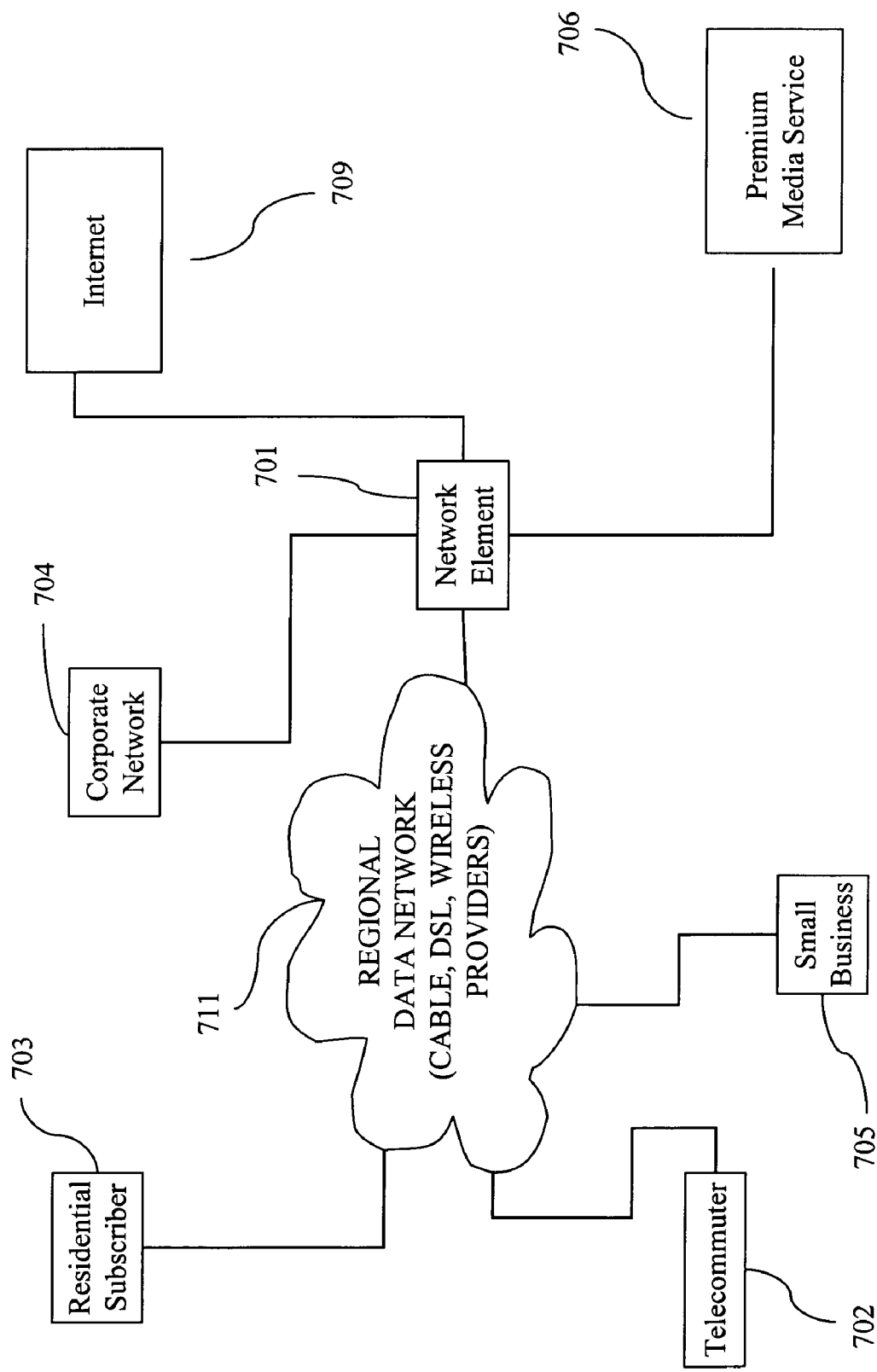
FIG. 7 is a diagram of an exemplary application of a network element aggregating subscribers and managing multiple services according to one embodiment of the invention.

FIG. 7 is a diagram of an exemplary application of a network element aggregating subscribers and managing multiple services according to one embodiment of the invention. In the example of FIG. 7, multiple subscribers (such as residential subscribers 703, telecommuters 702, a small business 705, etc) connect to a regional data network cloud 711. The network cloud 711 can include digital subscriber line (DSL), cable, wireless network access, etc. The network cloud 711 feeds into the network element 701. A corporate network 704 may also feed into the network element 701. The subscribers can access services, such as the Internet 709 or premium services 706, through the network element 701.

Service providers who need to widely deploy broadband access across their regional or national customer base would use the network element 701 to terminate multiple large circuits from multiple network providers (either carrier or cable operator) and manage the individual subscriber sessions. Remote provisioning of circuits eases the task of aggregating a large customer base. The ability to enter circuit configurations on RADIUS (or some other remote database) instead of a terminal connected to the network element provides an easier and manageable task for the network administrator. Furthermore, a single listening circuit structure enables oversubscribing. The network administrator can configure a number of listening circuits greater than the number of circuits supported by a network element's resources. As an illustration, a network element may have the hardware to support 10,000 circuits but memory resources only support 8000 circuits. The network administrator can configure 9000 or 10000 circuits as listening circuits. Oversubscribing circuits reduces tasks for the network administrator. On example of the advantage of oversubscribing is when a subscriber cancels his/her DSL service for cable service then the network administrator does not have to make any changes to the network element since all circuits are listening. The new circuit receiving the subscriber's cable traffic will be provisioned and the circuit previously carrying DSL traffic will be reassociated with the listening circuit structure. Provisioning a circuit in response to a traffic trigger enables more efficient service to customers and quicker deployment of network elements. The network element can authenticate each subscriber (703, 702, 704, and 705), can integrate with the existing accounting and operational database(s), and can send the groomed traffic to the Internet 709 via a backbone directly or a backbone router.

Figure 8:
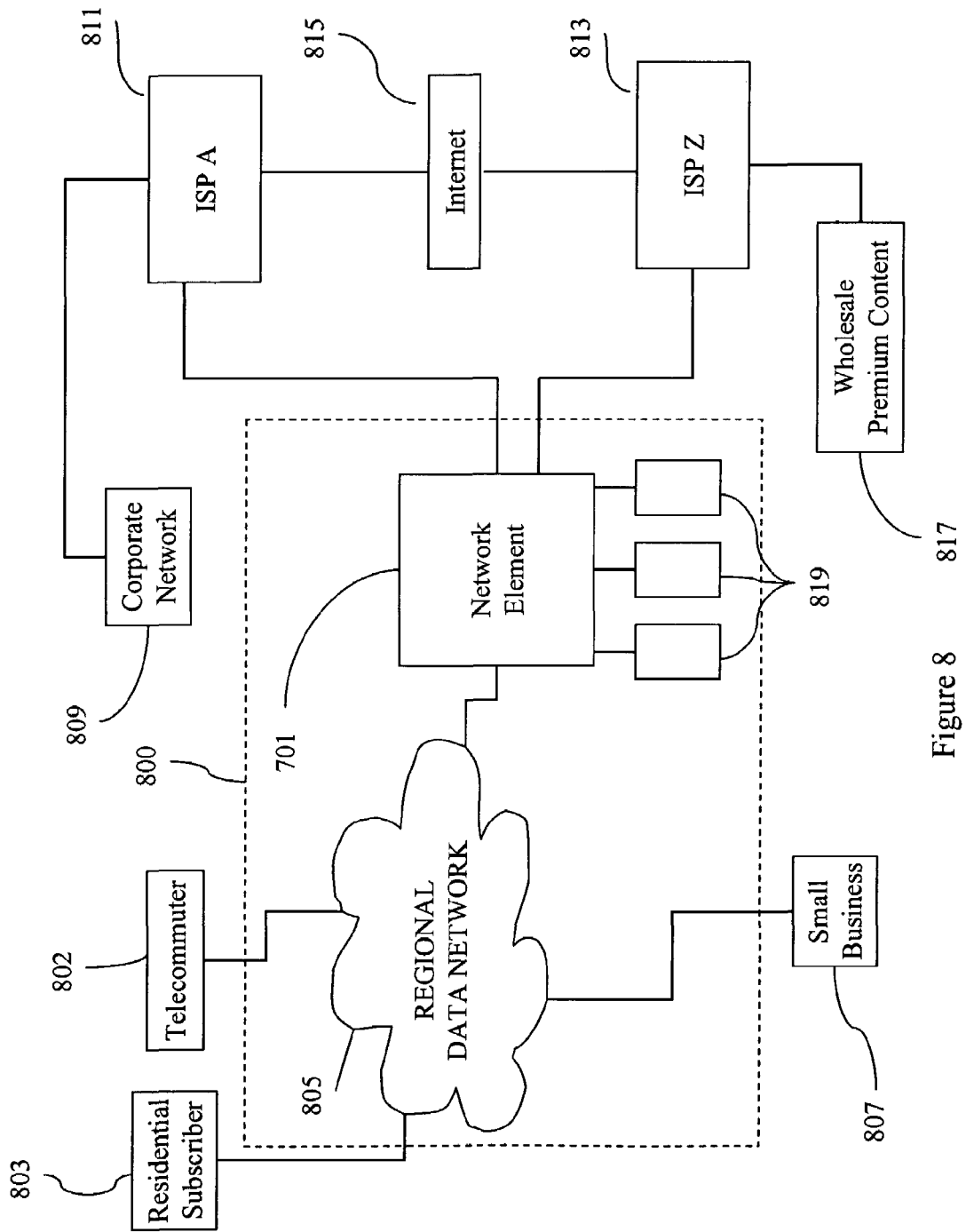
FIG. 8 is a diagram illustrating another exemplary application of the network element in a wholesale model for broadband access and IP services according to one embodiment of the invention.

FIG. 8 is a diagram illustrating another exemplary application of the network element in a wholesale model for broadband access and IP services according to one embodiment of the invention. In the example of FIG. 8, a dashed square 800 around a regional data network cloud 805 and the network element 701 of FIG. 7 indicates a network provider 800. Subscriber's such as residential subscribers 803, small business 807, or a telecommuter 802 can connect to a regional data network cloud 805. The regional data network cloud feeds into the network element 701. In FIG. 8, the network element 701 of FIG. 7 connects to Internet Service Providers (ISPs) A 811 and ISP Z 813. ISP A 811 connects to a corporation 809. ISP Z 813 connects to a wholesale premium content service 817. Both ISP A 811 and ISP Z provide access to the Internet backbone 815. The network provider 800 can have its own access offerings and value added services 819.

A network provider 800 implementing a wholesale model could use the network element 701 to provide wholesale broadband access and IP services to its ISP customers 811, 813. The network provider 800 can include a regional data network 805 feeding into the network element 701 of FIG. 7. Using the powerful wholesale capabilities and scalability of the network element 701, the network provider 800 could deliver access bandwidth, IP-based applications and premium content 817 to hundreds of retail access providers 811, 813 through a single network element 701. Remote circuit provisioning enables the network provider to easily configure new circuits for a new ISP customer and meet the requirements of customers quickly and efficiently.

It should be understood that the exemplary application of FIGS. 7 and 8 are not mutually exclusive, but rather that one network element may perform both applications simultaneously.

The techniques shown in the figures can be implemented using code and data stored and executed on computers. Such computers store and communicate (internally and with other computers over a network) code and data using machine-readable media, such as magnetic disks; optical disks; random access memory; read only memory; flash memory devices; electrical, optical, acoustical or other form of propagated signals (e.g., carrier waves, infrared signals, digital signals, etc.); etc. Of course, one or more parts of the invention may be implemented using any combination of software, firmware, and/or hardware.

While the invention has been described in terms of several embodiments, those skilled in the art will recognize that the invention is not limited to the embodiments described.

The provisioning of circuits could be implemented by alternative methods. Each circuit in the range of listening circuits could be grouped by similar parameters. For example, one group of circuits on slot 1 port 1 could carry PPP over ATM traffic while another group on the same slot and port could carry IP over ATM traffic. Each group would be associated to a listening circuit structure containing the encapsulation information for that group. When a listening circuit receives traffic, the network element could identify the listening circuit and begin to simultaneously process the packets received over the circuit and store the processed packets into a buffer while provisioning the listening circuit.

The method and apparatus of the invention can be practiced with modification and alteration within the spirit and scope of the appended claims. The description is thus to be regarded as illustrative instead of limiting on the invention.

We claim:

1. A method comprising:
   configuring on a network element a plurality of circuits as listening, the plurality of circuits associated with a listening circuit structure;
   converting any of said plurality of circuits configured as listening from listening to provisioned responsive to receipt of a packet thereon, wherein for each of the plurality of circuits converted said converting includes, creating a provisioned structure that is empty, retrieving a set of parameters for the circuit from a server external to the network element, populating the provisioned circuit structure with the set of parameters, and associating the circuit with the provisioned circuit structure; and reconverting any of said plurality of circuits configured as provisioned from provisioned back to listening responsive to a predetermined event associated with that circuit.

2. The method of claim 1, wherein the memory required for one of the plurality of circuits configured as listening is less than the memory required for one of the plurality of circuits configured as provisioned.

3. The method of claim 1, wherein said configuring includes enabling oversubscribing by having more circuits than could be configured as provisioned at any given moment.

4. The method of claim 1, further comprising:

processing the plurality of packets received on the plurality of circuits configured as provisioned.

5. The method of claim 4, further comprising:

transmitting the plurality of packets to the Internet.

6. The method of claim 1, wherein the predetermined event is an Internet Service Provider (ISP) suspending a subscriber.

7. The method of claim 1, wherein the predetermined event is a port failing, the port associated with one of the plurality of circuits configured as provisioned.

8. The method of claim 1, wherein the predetermined event is servicing the network element.

9. The method of claim 1, wherein the predetermined event is a subscriber switching from DSL service to cable service.

10. A method comprising:

for each of a plurality entities, configuring in a network element a plurality of circuits as listening;

allowing each of said plurality of entities to maintain different sets of parameters for different ones of their plurality of circuits in a remote database, wherein the various sets of parameters specify accessibility of subscribers through said network element to networks of said plurality of entities;

for each of said circuits currently configured as listening on which a packet is received from one of said subscribers, attempting to provision in the network element that circuit with its set of parameters in said remote database; and for each of said plurality of circuits that is currently provisioned on which a subscriber ending event occurs, unprovisioning that circuit in the network element.

11. The method of claim 10, wherein said subscribers comprise at least one of residential, telecommuter, small business and corporation.

12. The method of claim 10, wherein said remote database is a RADIUS database.

13. The method of claim 10, wherein the subscriber ending event is an Internet Service Provider (ISP) suspending one of said subscribers.

14. The method of claim 10, wherein the subscriber ending event is a port failing, the port associated with one of the plurality of circuits currently provisioned.

15. The method of claim 10, wherein the subscriber ending event is servicing the network element.

16. The method of claim 10, wherein the subscriber ending event is one of said subscribers switching from DSL service to cable service.

17. A method comprising:

for each of a plurality of entities, configuring in a network element a plurality of circuits as listening as opposed to provisioned, wherein the network element lacks parameters to process packets received on those of the circuits currently configured as listening as opposed to provisioned, but attempts to access such parameters from a remote database responsive to receipt of packets thereon; and allowing each of said plurality of entities to remotely provision their plurality of circuits configured as listening through maintenance of sets of parameters in said remote database that are retrieved as needed by the network element responsive to receipt of packets on those of the circuits configured as listening, wherein the various sets of parameters specify how to process packets of subscribers accessing services of said plurality of entities through said network element.

18. The method of claim 17, wherein one of said services is selected from the group consisting of a premium branded service, internet access service, wholesale media service and corporate network accessibility.

19. The method of claim 17, wherein said remote database is a RADIUS database.

\* \* \* \* \*